(12) United States Patent
Miller (10) Patent No.: US 9,170,106 B2
(45) Date of Patent: Oct. 27, 2015

(54) SHOCK-RESISTANT DEVICE AND METHOD

(75) Inventor: Kirk A. Miller, Dallas, TX (US)

(73) Assignee: Raytheon Corporation, Waltham, MA (US)

( * ) Notice: Subject to any disclaimer, the term of this patent is extended or adjusted under 35 U.S.C. 154(b) by 738 days.

(21) Appl. No.: 13/450,631

(22) Filed: Apr. 19, 2012

(65) Prior Publication Data

US 2013/0277500 A1  Oct. 24, 2013

(51) Int. Cl.
*G01C 19/26* (2006.01)
*F16F 15/02* (2006.01)
*G03B 15/00* (2006.01)

(52) U.S. Cl.
CPC ............... *G01C 19/26* (2013.01); *F16F 15/02* (2013.01); *G03B 15/006* (2013.01); *G03B 2205/0007* (2013.01)

(58) Field of Classification Search
CPC .............................. G01C 19/26; G03B 15/006
See application file for complete search history.

(56) References Cited

U.S. PATENT DOCUMENTS

| | | | | |
|---|---|---|---|---|
| 3,094,054 | A * | 6/1963 | Moors et al. | 396/13 |
| 3,430,499 | A * | 3/1969 | Craig | 74/5.1 |
| 3,473,391 | A | 10/1969 | Williamson et al. | |
| 3,677,098 | A * | 7/1972 | Davis | 74/5.12 |
| 3,795,139 | A | 3/1974 | Peck | |
| 3,913,870 | A * | 10/1975 | Bolick | 244/3.2 |
| 5,124,938 | A | 6/1992 | Algrain | |
| 2009/0218447 | A1 * | 9/2009 | von Flotow et al. | 244/131 |
| 2009/0301236 | A1 | 12/2009 | Baudasse | |

FOREIGN PATENT DOCUMENTS

| | | |
|---|---|---|
| GB | 1 464 116 A | 2/1977 |
| JP | 01 307603 A | 12/1989 |
| JP | 09-210255 A | 8/1997 |

OTHER PUBLICATIONS

International Search Report and the Written Opinion of corresponding International Application No. PCT/US2013/025731 mailed Jun. 18, 2013.

* cited by examiner

*Primary Examiner* — Brian M O'Hara
(74) *Attorney, Agent, or Firm* — Renner, Otto, Boisselle & Sklar, LLP (57) ABSTRACT

A shock-resistant device includes snubbers that may be selectively extended to selectively create a stiff attachment between a vibration-isolated component of the device, and another part of the device. The snubbers may be electromechanical or hydraulically driven. The device may be a sensor system for an unmanned aerial vehicle, with the snubbers extendible to create a stiff attachment between an inner gimbal and an outer shell of the sensor system, for example prior to landing the unmanned aerial vehicle on an aircraft carrier, or prior to transportation or storage of the unmanned aerial vehicle. The snubbers may be able to be manually actuated, even when the unmanned aerial vehicle has no power available.

19 Claims, 5 Drawing Sheets

SHOCK-RESISTANT DEVICE AND METHOD

GOVERNMENT LICENSE RIGHTS

This invention was made with Government support under Contract No. N00019-08-C-0023, awarded by the United States Navy. The Government has certain rights in the invention.

BACKGROUND OF THE INVENTION

1. Field of the Invention

The invention is in the field shock-resistant devices and methods.

2. Description of the Related Art

It is advantageous sometimes for devices to have vibration isolation, with one part vibration isolated from another part. In such an arrangement there may be damping devices between the parts, with the vibration-isolated part able to move to some extent relative to the other part. One problem is that severe shocks to such systems may cause undesirable movement or forces on the isolated parts. It would be desirable for improvements in such devices, and in methods of using them.

SUMMARY OF THE INVENTION

According to an aspect of the invention, a shock resistant device includes: a first part; a second part movable relative to the first part; and actuatable snubbers for selectively creating a stiff attachment between the parts.

According to another aspect of the invention, a method of protecting a device against one or more shocks, includes: operating the device in a vibration isolation mode, with vibration dampers between a first part of the device and a second part of the device, with the second part able to move relative to the first part, damped by the vibration dampers; and prior to the one or more shocks, shifting the device from the vibration isolation mode to a shock protection mode by extending snubbers of the device to provide a stiff attachment between the first part and the second part.

According to yet another aspect of the invention, an unmanned aerial vehicle includes: a fuselage; and a sensor system coupled to the fuselage. The sensor system includes: an outer shell; an inner gimbal within the outer shell; and extendible snubbers that selectively couple together the inner gimbal and the outer shell. When the snubbers are not extended, the inner gimbal is vibrationally isolated from the outer shell, and able to move relative to the outer shell. When the snubbers are extended, the inner gimbal is stiffly coupled to the outer shell.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A shock-resistant device includes snubbers that may be selectively extended to selectively create a stiff attachment between a vibration-isolated component of the device, and another part of the device. The snubbers may be electromechanical or hydraulically driven. The device may be a sensor system for an unmanned aerial vehicle, with the snubbers extendible to create a stiff attachment between an inner gimbal and an outer shell of the sensor system, for example prior to landing the unmanned aerial vehicle on an aircraft carrier, or prior to transportation or storage of the unmanned aerial vehicle. The snubbers may be able to be manually actuated, even when the unmanned aerial vehicle has no power available.

Figure 1:
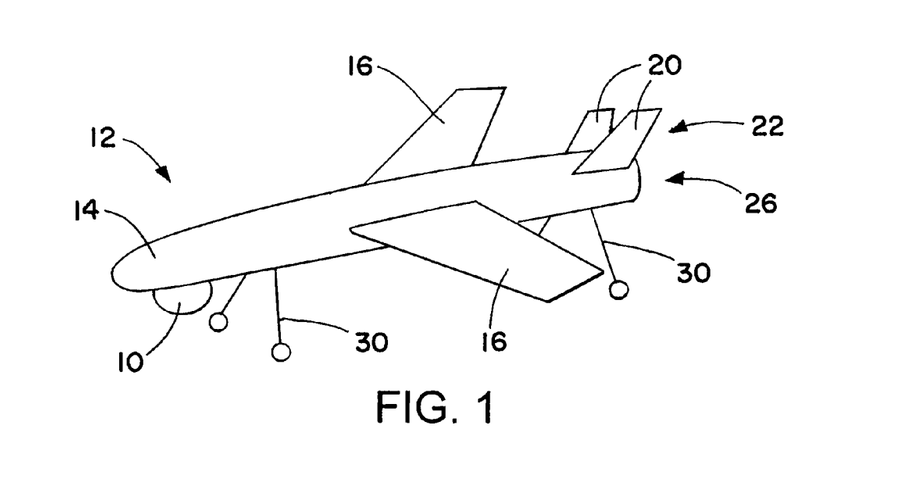
FIG. 1 is an oblique view of an unmanned aerial vehicle (UAV) according to an embodiment of the present invention.

FIG. 1 shows a sensor system 10 that is part of an unmanned aerial vehicle (UAV) 12. The UAV 12 has many characteristics that are common with current UAVs, such as drones. The UAV 12 has a fuselage 14 for enclosed its main components, such as 1) wings 16 for providing lift; 2) control surfaces 20 at a tail 22 of the UAV 12 for steering or otherwise changing course of the UAV 12; and 3) a propulsion system 26. The control surfaces 20 alternatively may be in other locations on the UAV 12, such as being canards at the front of the UAV 12, and/or integrated with the wings 16. The propulsion system 26 may be any of a variety of suitable propulsion systems, including propeller engines, jet engines, and rocket motors. Other suitable systems may also be included in the UAV 12, including control systems for controlling the various components, and a communication system for sending and receiving information, for instance to control the UAV 12 and to receive data, such as sensor data, from the UAV 12. The UAV 12 may include landing gear 30 to support the UAV 12 during takeoff or landing, and while it is on the ground or otherwise not airborne.

Figure 2:
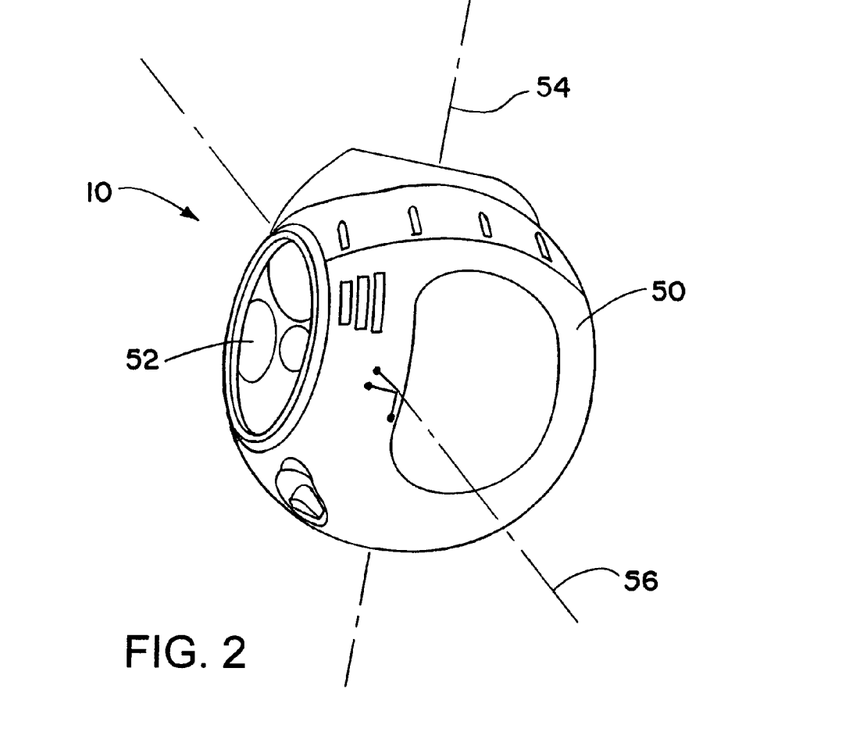
FIG. 2 is an oblique view of the sensor system of the UAV of FIG. 1.

FIG. 2 shows further details of the sensor system 10. The sensor system 10 has an outer shell 50 and an inner gimbal 52. A payload, such as sensors, for example including a camera, is located within inner gimbal 52, as in being located within a hollow space in the inner gimbal 52. In normal operation, the inner gimbal 52 is vibration isolated from the outer shell 50 and rotates relative to the outer shell 50 with multiple degrees of freedom.

The entire sensor system 10 is able to rotate about a vertical axis 54, relative to the fuselage 14 (FIG. 1). In addition the outer shell 50 is able to rotate a horizontal axis 56, and the inner gimbal 52 is able to change orientation relative to the outer shell 50. The terms "vertical axis" and "horizontal axis" refer to the orientation of the axes 54 and 56 when the UAV 12 (FIG. 1) is in level flight, oriented parallel to the ground. The terms are not meant to be limiting, but refer to axes at different orientations, such as being perpendicular to one another.

The rotation of the sensor system 10 as a whole, and the pivoting of the outer shell 50, are used to position the sensor payload in a coarse sense. This may be done, for example, to position a camera in the general direction of an object or scene of interest that is to be observed. The inner gimbal 52 is used to provide fine adjustment to the camera or other sensor position. This can be used to keep the camera pointed in the same direction, at a desired viewing target, even when the UAV 12 changes course, maneuvers, or is buffeted during flight. When viewing a far off visual target, to maintain surveillance at a selected spot or region, it may be important to keep a visual sensor (camera) or other sensor very accurately positioned, all while the UAV 12 continues flying. The inner gimbal 52 not only can rotate relative to the outer shell 50, but also is able to damp vibrations from different directions. Toward that end, there may be vibration dampers between the outer shell 50 and the inner gimbal 52, resilient damping devices that allow the inner gimbal 52 to move relative to the outer shell 50, during normal operation of the sensor system 10. All of this damping and isolating of the inner gimbal 52 and its payload is important in keeping a visual sensor accurately positioned to continue to view a distant location while the UAV 12 moves and vibrates, and of necessity changes direction from time to time. The positioning of the sensor system 10, and its various parts, may be handled by a sensor control system (not shown), which interfaces with a communication system (not shown) that allows a remote operator to adjust the position of the camera or other visual sensor, to control what portion of a potential field of view is being focused on.

One difficulty occurs when there are severe shocks to the sensor system 10, an example of such a severe shock being when the UAV 12 lands, such as when the UAV 12 lands on an aircraft carrier. Such shocks can put the sensor system, such as an optical sensor, out of alignment. Nonetheless, such shocks may be predictable, since it is known in advance when the UAV 12 will be landing. Furthermore, it is not important for the sensor system 10 to be operational during landing.

Figure 3:
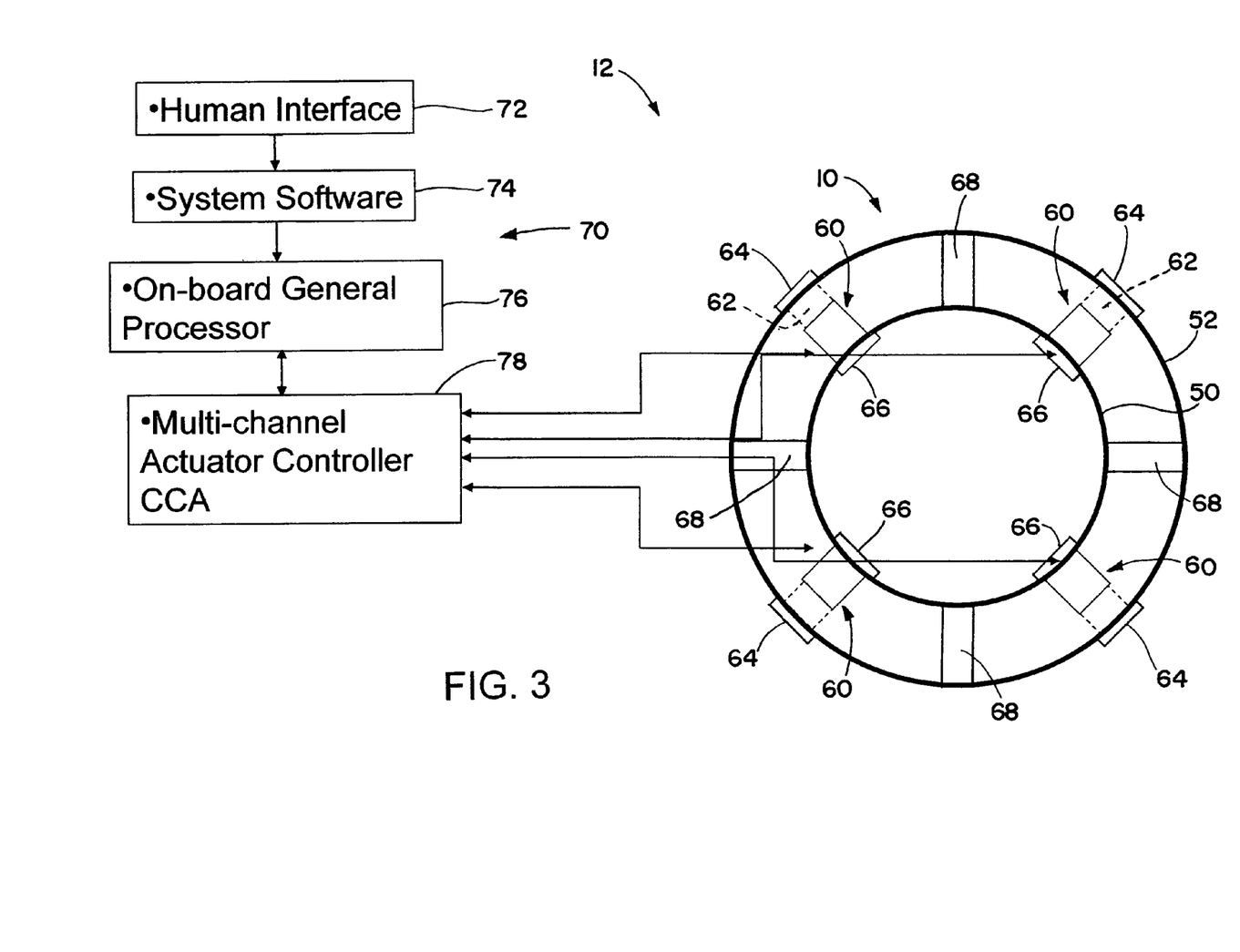
FIG. 3 is a schematic view illustrating further details of the sensor system of FIG. 2, and a control system for controlling the sensor system.

Accordingly, with reference now to FIG. 3, snubbers 60 may be used to selectively secure the inner gimbal 52 to the outer shell 50. The snubbers 60 are selectively actuatable devices that have extendible elements or members 62 that may be extended to provide a firmer (stiffer) mechanical connection between the inner gimbal 52 and the outer shell 50, to lessen movements of the inner gimbal 52 within the outer shell 50 when a severe shock is encountered. The snubbers 60 may be located in mating pockets 64 and 66 in the outer shell 50 and the inner gimbal 52, respectively.

FIG. 3 shows a schematic view of the operation of the snubbers 60, with four of the snubbers 60 in the illustrated schematic. However in actual use a different number of the snubbers 60 may be employed, for example with more snubbers 60 used to secure the inner gimbal 52 against movements in a variety of directions. Damping or vibration isolation devices 68 allow some movement of the inner gimbal 52 relative to the outer shell 50, to isolate the inner gimbal 52 (and its payload) from vibrations in the outer shell 50 (and the rest of the UAV 12).

A control system 70 for controlling the snubbers 60 may include a human interface 72, system software 74, an onboard general processor 76, and a multi-channel actuator controller circuit card assembly (CCA) 78. The human interface 72 may allow a human operator controlling the UAV 12 to selectively activate the snubbers 60, by sending an appropriate signal to the UAV 12. The signal passes through the software 74, the processor 76, and the CCA 78, to instruct the snubbers 60 to extend their respective extendible members 62. As an alternative, the snubbers 60 may be automatically actuated upon the occurrence of one or more predetermined conditions, such as the UAV 12 being readied for landing.

The snubbers 60 may also be activated when the UAV 12 is not in flight, for example when the UAV 12 is in storage or in transport. Activating the snubbers 60 when the UAV 12 is inactive helps protect the sensor system 10 from misalignment or damage. When the snubbers 60 are activated, a stiff attachment is created between the inner gimbal 52 and the outer shell 50, preventing the relative movement that the damping devices 68 would ordinarily allow. This stiff attachment makes the sensor system 10 better able to withstand shocks. The snubbers 60 may be activated (extended) for landing, and maintained in such a condition until the UAV 12 enters flight again.

In operation, the sensor system 10 may be in a vibration isolation mode during normal operation of the UAV 12. In such a mode the snubbers 60 are retracted and the inner gimbal 52 is free to move relative to the outer shell 50. The inner gimbal 52 is vibration isolated from the outer shell 50, with the dampers 68 providing vibration isolation. Before landing (or other expected shocks), the snubbers 60 may be actuated (extended) to shift the sensor system 10 from the vibration isolation mode to a shock protection mode, with a stiff attachment between the outer shell 50 and the inner gimbal 52.

Figure 4:
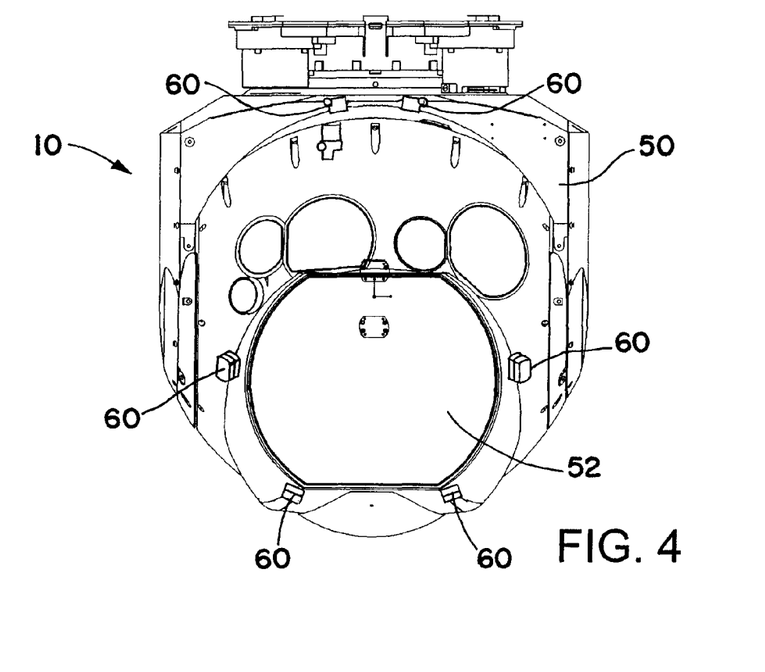
FIG. 4 is a front view of the sensor system of FIG. 2, showing one possible arrangement of snubbers within the sensor system.
Figure 5:
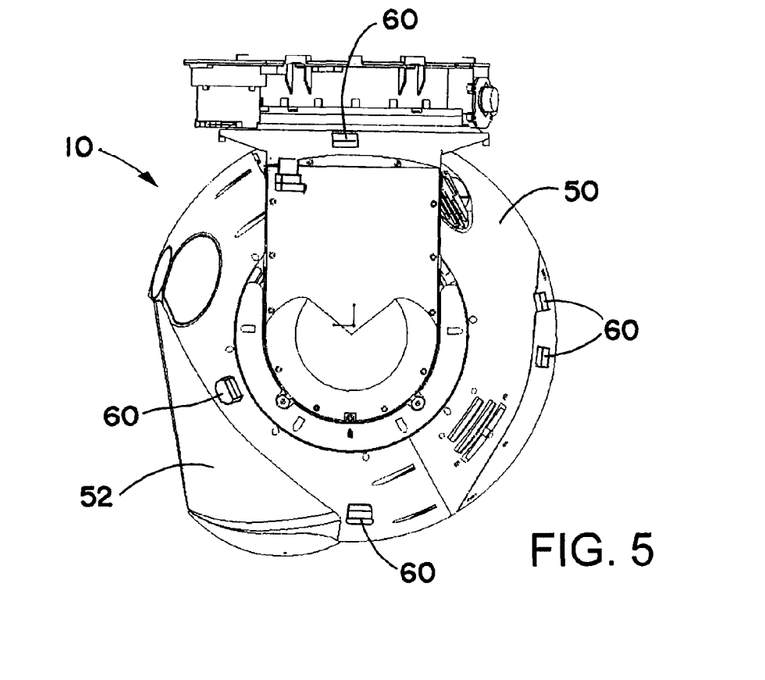
FIG. 5 is a side view of the sensor system of FIG. 4.

FIGS. 4 and 5 show one possible arrangement for the snubbers 60 within the outer shell 50. The snubbers 60 may be located in suitable recesses in the outer shell 50 and/or the inner gimbal 52. The snubbers 60 may extend from the inner gimbal 52 to the outer shell 50, or vice versa. In the illustrated embodiment there are eight of the snubbers 60. Alternatively there may be more of the snubbers 60, or fewer of them.

Figure 6:
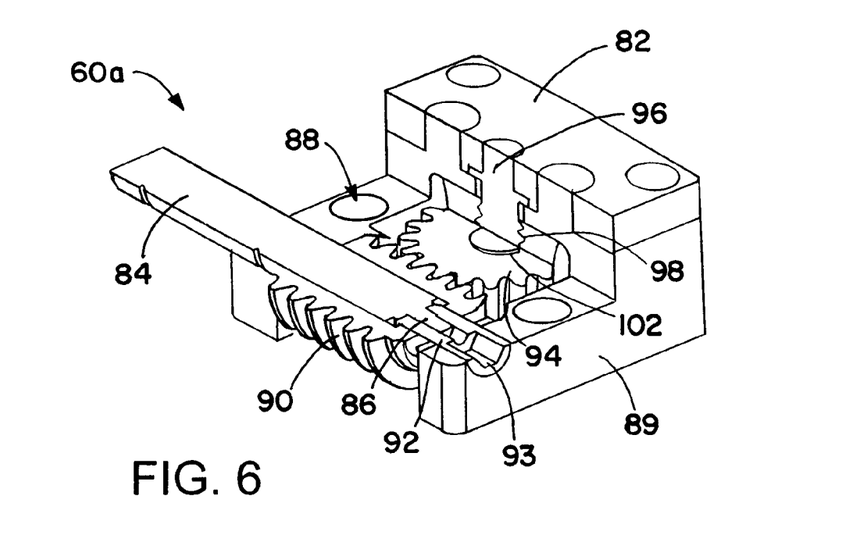
FIG. 6 is a partial cutaway view of a first embodiment snubber usable in the sensor system of FIG. 2.

FIG. 6 shows one example of a snubber 60, a snubber 60a. The snubber 60a is an electromechanical actuator for selectively extending a snubber element 82. A small motor 84 has a shaft 86 that is coupled to gearing 88. The motor 84 is fixed to a housing 89 that houses the gearing 88 of the snubber 60a. The gearing 88 includes a worm gear 90 that is fixed to the motor shaft 86 through a coupler 92. The worm gear 90 uses the outside diameter of the motor 84 as a bushing surface. The coupler 92 has a hex head 93 that may be used for manual operation of the snubber 60a. The worm gear 90 is in turn coupled to a worm wheel 94. The worm gear 90 may be made of a plastic material such as nylon (polyamide), and the worm wheel 94 may be made of brass, although other suitable materials may be used instead. The plastic-brass combination has the advantage of not requiring grease or another lubricant.

A threaded shaft 96 is fixedly attached to the snubber element 82. Threads 98 on the bottom of the shaft 96 mate with corresponding threads 102 at the middle of the worm wheel 94, so that when the worm wheel turns 94, the shaft 96 goes up or down, extending or retracting the snubber element 82.

The motor 84 may be any of a variety of suitable electric motors, an example of a suitable motor being a 6 mm MICROMO 4.5 volt motor with an integral encoder and 256:1 planetary gear head, although many other suitable kinds of motors may be used instead. The motor 84 may be powered from the same power system that powers other components of the UAV 12 (FIG. 1). The gearing 88 may have a gearing ratio of 20:1.

The hex head 93 of the coupler 92 may be engaged with a suitable tool, such as an Allen wrench, to extend or retract the snubber element 82 even when power to the UAV 12 (FIG. 1) is off. It may be useful for the snubber 60*a* to be manually operated even when the UAV 12 is not powered up, for instance in order to extend the snubbling element 82 before transportation and/or storage of the UAV 12.

The snubber 60*a* may have an actuation time of 37 seconds, a peak actuation force of 120 pounds, an estimated shock capacity in excess of 39 Newtons (4000 pounds), and a weight of 36 grams (0.08 pounds). These are values for one specific embodiment, and a large range of other values are possible.

Figure 7:
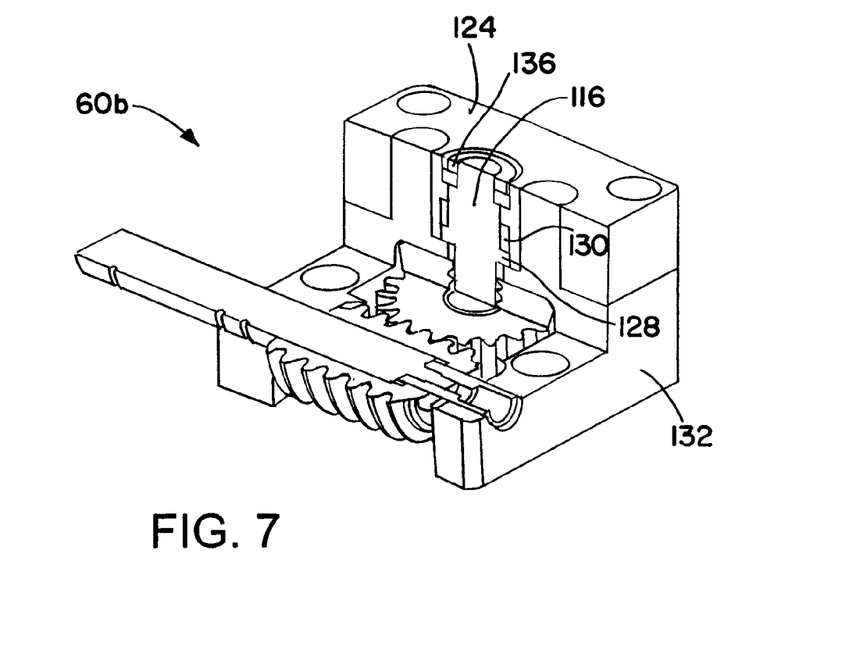
FIG. 7 is a partial cutaway view of a second embodiment snubber usable in the sensor system of FIG. 2.

The snubber 60*a* provides a normal force to aid in securing the inner gimbal 52 (FIG. 2) to the outer shell 50 (FIG. 2). FIG. 7 shows a variant, an electromechanical snubber 60*b* that provides additional securing, securing both against normal forces and shear forces. The snubber 60*b* has many features in common with the snubber 60*a*, and some of these common features are omitted in the description below.

The threaded shaft 116 of the snubber 60*b* is not fixedly attached to the snubber element 124, but rather is able to move to some extent relative to the snubber element 124. The threaded shaft 116 includes a central flange 128 that moves to some extent within a cavity 130 in the snubber element 124. As the threaded shaft 116 turns as part of the extension process, raising the threaded shaft 116 relative to a housing 132, the snubber element 124 initially does not extend. Instead, initially a dog 136 on the end of the threaded shaft 116 extends above the top of snubber element 124. Once the flange 128 reaches a shelf 140 on the snubber element 124, the snubber element 124 begins to extend as well, but the dog 136 continues to protrude from the snubber element 124. When the snubber element 124 is fully extended, the protruding dog 136 engages a corresponding recess in the outer shell 50 (FIG. 2), or alternatively a recess in the inner gimbal 52 (FIG. 2). This engagement of the dog 136 helps the snubber 60*b* better resist shear forces that might otherwise move the inner gimbal 52.

The snubber 60*b* may have an actuation time of 78 seconds, an actuator throw of 2.5 mm (0.1 inch), a shear pin (threaded shaft) stroke of 2.5 mm (0.1 inch), a peak actuation force of 1.2 Newtons (120 pounds), an estimated shock capacity in excess of 39 Newtons (4000 pounds), and a weight of 43 grams (0.095 pounds). These are values for one specific embodiment of the snubber 60*b*, and a large range of other values are possible.

Figure 8:
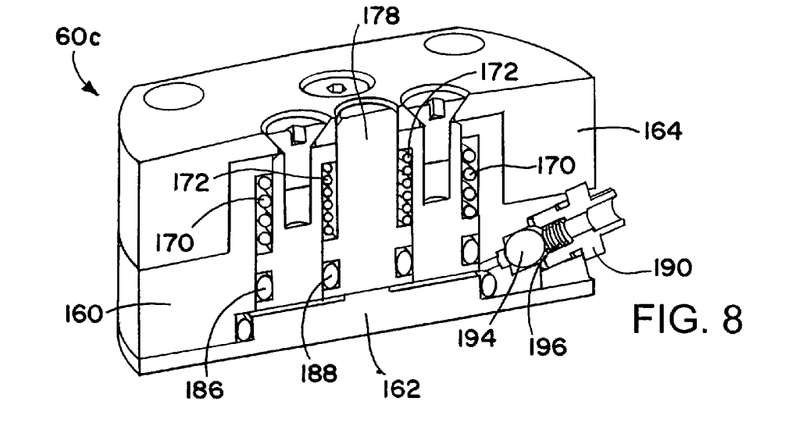
FIG. 8 is a cutaway view of a third embodiment snubber usable in the sensor system of FIG. 2.

FIG. 8 shows another type of snubber, a snubber 60*c* that is a hydraulic snubber, rather than an electromechanical snubber. The snubber 60*c* includes a housing 160 that includes a cavity 162, for receiving pressurized hydraulic fluid to extend a snubber element 164. Pressurized fluid in the cavity 162 is used to overcome the spring forces in springs 170 and 172, to extend the snubber element 164 and a central dog 178 that also extends from the housing 160, with the central dog 178 extending beyond the snubber element 164. The spring force of the spring 170 must be overcome to extend the snubber element 164 as a whole, while the spring force of the spring 172 must be overcome to extend the central dog 178 relative to the rest of the snubber element 164. The snubber element 164 and the dog 178 have respective O-rings 186 and 188 to seal around them. The spring forces of the springs 170 and 172 may be such that the snubber element 164 requires less hydraulic pressure to extend than does the dog 178. For example the dog 178 may require 37 psi to extend, while the snubber element 164 needs only 8 psi to extend.

The snubber 60*c* includes a backflow preventer 190, a check valve that freely allows of hydraulic fluid in, while preventing flow of fluid out of the cavity 162 as the result of a shock on the snubber element 164. When a shock presses the snubber element 164 back onto the housing 160, a check ball 194 of the backflow preventer 190 presses back onto a seat 196, blocking outflow from the cavity 162. Fluid may be slowly bleed from the cavity 162 through the valve 190, without causing the check ball 194 to seat.

The snubber element 164 prevents movement from normal forces, while the dog 178 prevents movement from shear forces. The housing 160, the snubber element 164, and the dog 178 fit into appropriate mating pockets to enable carrying of shear forces.

The snubber 60*c* may have an actuation time of 59 seconds, an actuator throw of 2.5 mm (0.1 inch), a shear pin (threaded shaft) stroke of 2.5 mm (0.1 inch), a peak actuation force of 0.8 Newtons (80 pounds), an estimated shock capacity in excess of 39 Newtons (4000 pounds), and a weight of 36 grams (0.08 pounds). These are values for one specific embodiment of the snubber 60*c*, and a large range of other values are possible.

Figures 9, 10:
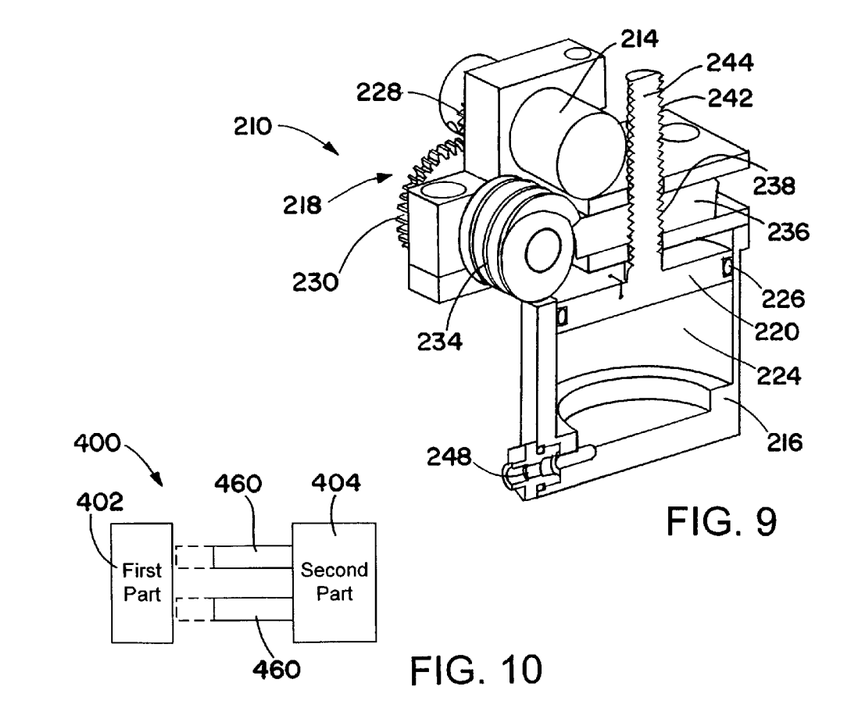
FIG. 9 is a cutaway view of a pump for use with the snubber of FIG. 8.
FIG. 10 is a schematic view of a shock resistant device in accordance with an embodiment of the invention.

FIG. 9 shows a hydraulic pump 210 that is usable with the snubber 60*c* (FIG. 8) to provide pressurized hydraulic fluid to multiple of the snubbers 60*c*. A motor 214 is fixed to a pump housing 216 of the pump 210. The motor 214 is coupled to gearing 218 that raises and lower a piston 220, to move hydraulic fluid into and out of a hydraulic fluid reservoir 224. The piston 220 has a seal 226 around its head, preventing hydraulic fluid from escaping the reservoir 224 around the sides of the piston head. The gearing 218 includes a first gear 228 attached to a drive shaft of the motor 214, a second gear 230 that meshes with the first gear 228. The second gear 230 is on the same shaft as a worm gear 234 that meshes with a worm wheel 236. The worm wheel 236 has a central threaded hole 238 that threadedly engages threads 242 on a shaft 244 of the piston 220.

Providing power to the motor 214 turns the drive shaft of the motor 214 (in either direction), which turns the gears 228 and 230, as well as the worm gear 234 and the worm wheel 236, raising or lowering the piston 220. Raising or lowering the piston 220 causes hydraulic fluid to flow into or out of the reservoir 224, through a pump outlet 248. The pump outlet 248 is coupled to the valves (backflow preventers) 190 (FIG. 8) of the multiple snubbers 60*c* (FIG. 8), such as through a suitable manifold (not shown). The pump 210 may be configured to raise the piston slowly enough to retract the snubber elements 164 (FIG. 8) slowly enough to prevent seating of the balls 194 (FIG. 8) of the valves 190 to seat.

In a specific embodiment, the motor 214 is a 10 mm MICROMO 12-volt motor with an integral encoder and 64:1 planetary gear head. Other suitable motors may be used instead. The worm gear 234 may be made of a plastic material such as nylon (polyamide), and the worm wheel 236 may be made of brass, although other suitable materials may be used instead. The plastic-brass combination has the advantage of not requiring grease or another lubricant. The worm-gear-worm-wheel combination may have a gear ratio of 10:1, or another suitable ratio. The reservoir 224 may be configured for a maximum pressure during operation of about 200 psi, which occurs while the snubber elements 164 (FIG. 8) are being extended.

The piston 220 and/or the snubbers 60*c* may be manually actuated to manually extend or retract the snubber elements 164 (FIG. 8). Suitable tools may be used to turn the gearing 218 manually, to extend or retract the snubber elements 164 and the central dogs 178 (FIG. 8).

The snubbers 60 may be made of any of a variety of suitable materials. For example the snubber elements and/or the housings may be made of aluminum or other suitable metals.

The various snubbers 60 described above as possible components of the sensor system 10 (FIG. 1) provide advantages over prior approaches to handling shocks to such sensor systems. The extension of the elements of the snubbers provide an inexpensive, low-mass, and high-reliability way to create a statically compliant attachment between vibration isolated components and a base structure, during a shock event such as landing of a UAV 12 (FIG. 1). The snubbers 60 prevent collisions between the inner gimbal 52 and the outer shell 50. The snubbers 60 take only a small amount of volume, not impacting the other components of the sensor system 10. The snubbers 60 can be actuated remotely and/or automatically, to extend and retract the snubbers 60 during operation (flight) of the UAV 12. Thus the snubbers 60 can be engaged (extended) only when needed, such as only during expected shock events, while still allowing full functioning of the system at other times, allowing for example full functionality of the sensor system 10 (allowing full regular relative motion and vibration damping between the gimbal 52 and the outer shell 50) when the snubbers 60 have their elements retracted. Other possible advantages of the systems described herein are low power usage, high shock load carrying capacity, and ability to be implemented with minimal changes to present hardware configurations.

The snubbers 60 are described above as parts of a sensor system that is part of a UAV. However the snubbers 60 may be used for a variety of other systems that are subject to shocks and/or vibrations, for selectively providing a stiffer connection between parts of systems that can otherwise move relative to one another. For example the snubbers 60 may be used for selectively providing a stiffer connection between parts of a washing machine, or other rotating machinery. The snubbers may be selectively deployed (extended) to "lock" parts together, for storage, transportation, or for other reasons.

FIG. 10 shows a general shock resistant device 400 having a first part 402, and a second part 404 that is mechanically coupled relative to the first part 402. The second part 404 is in normal operation able to move relative to the first part 402. For example the second part 404 may be vibrationally isolated from the first part 402. The device 400 contains a series of snubbers 460 with extendible elements for selectively creating a stiff attachment between the first part 402 and the second part 404. The snubbers 460 may have any of the different snubber configurations described above. The parts 402 and 404 may have any of a variety of sizes, shapes, and spatial relationships to one another. The parts 402 and 404 need not necessarily be round, circular, or spherical.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shock resistant device comprising:
   an outer shell forming a first spherical portion having a radially inward facing surface;
   an inner gimbal for housing a visual sensor and movable relative to the outer shell, the inner gimbal forming a second spherical portion having a radially outward facing surface opposite the radially inward facing surface; and
   actuatable snubbers for selectively creating a stiff attachment between the outer shell and the inner gimbal;
   wherein the snubbers have respective snubber elements that are extended between the radially inward facing surface and the radially outward facing surface when the snubbers are actuated to create the stiff attachment between the outer shell and the inner gimbal,
   wherein the inner gimbal can rotate relative to the outer shell when the snubbers are not actuated; and
   wherein the snubbers are extendable between the outer shell and the inner gimbal such that extending the snubbers to directly engage either the radially inward facing surface of the outer shell or the radially outward facing surface of the inner gimbal results in the stiff attachment between the outer shell and the inner gimbal.

2. The shock resistant device of claim 1, wherein the inner gimbal is vibration isolated from the outer shell.

3. The shock resistant device of claim 2,
   further comprising vibration dampers between the radially inward facing surface of the outer shell and the radially outward facing surface of the inner gimbal that allow movement and damp vibrations between the outer shell and the inner gimbal when the snubbers are not actuated to create the stiff attachment between the outer shell and the inner gimbal;
   wherein actuation of the snubbing devices stiffens the attachment between the outer shell and the inner gimbal to a greater stiffness than that provided by the vibration dampers.

4. The shock resistant device of claim 1, wherein the snubbers are electromechanical snubbers.

5. The shock resistant device of claim 4, further comprising an electric motor and gearing that are operatively coupled to at least one of the snubbers, to extend and retract snubber elements of the at least one of the snubbers.

6. The shock resistant device of claim 1, wherein the snubbers are hydraulic snubbers.

7. The shock resistant device of claim 6, further comprising a pump operatively coupled to the hydraulic snubbers to provide pressurized fluid to the hydraulic snubbers.

8. The shock resistant device of claim 1, wherein the snubbers also have respective dogs that extend beyond the respective snubber elements, to engage a corresponding recess in at least one of the radially outward facing surface and/or the radially inward facing surface, thereby resisting relative transverse movement between the outer shell and the inner gimbal.

9. The shock resistant device of claim 1, wherein the snubbers are located in mating pockets in at least one of the outer shell and the inner gimbal.

10. The shock resistant device of claim 1, wherein the snubbers may be manually actuated.

11. The shock resistant device of claim 1, wherein the inner gimbal includes a visual sensor.

12. The shock resistant device of claim 1, wherein the inner gimbal includes a camera.

13. The shock resistant device of claim 1, wherein the shock resistant device is a sensor system that is part of an unmanned aerial vehicle;
further comprising a fuselage of the unmanned aerial vehicle that the sensor system is mechanically coupled to.

14. The shock resistant device of claim 1, wherein the snubbers extend from the inner radially outward facing surface to the radially inward facing surface.

15. The shock resistant device of claim 1, wherein a radially facing surface of each snubber element directly connects to one of the radially outward facing surface or the radially inward facing surface to provide a normal force between the radially outward facing surface and the radially inward facing surface.

16. The shock resistant device of claim 1, wherein at least one of the snubber elements has a radially facing surface and has a respective dog for selectively radially extending beyond the respective radially facing surface to engage a corresponding recess in one of the radially outward facing surface or the radially inward facing surface.

17. An unmanned aerial vehicle comprising:
a fuselage; and
a sensor system coupled to the fuselage;
wherein the sensor system includes:
an outer shell;
an inner gimbal for housing a visual sensor within the outer shell; and
extendible snubbers that selectively couple together the inner gimbal and the outer shell;
wherein, when the snubbers are not extended, the inner gimbal is vibrationally isolated from the outer shell, and able to move relative to the outer shell;
wherein, when the snubbers are extended, the inner gimbal is stiffly coupled to the outer shell; and
wherein the snubbers are extendable between the outer shell and the inner gimbal such that extending the snubbers to directly engage either a radially inward facing surface of the outer shell or a radially outward facing surface of the inner gimbal results in the stiff attachment between the outer shell and the inner gimbal.

18. The unmanned aerial vehicle of claim 17, wherein the snubbers are configured to extend to stiffly couple the outer shell to the inner gimbal when the vehicle is preparing to land.

19. The unmanned aerial vehicle of claim 17, wherein the snubbers are configured to disengage while the vehicle is in flight.

* * * * *